INVENTOR.
Anton F. Erickson

April 3, 1962  A. F. ERICKSON  3,027,975
BRAKE GREASE GUARD
Filed Sept. 9, 1959  3 Sheets-Sheet 2

INVENTOR.
Anton F. Erickson
BY
His Attorney

April 3, 1962   A. F. ERICKSON   3,027,975
BRAKE GREASE GUARD
Filed Sept. 9, 1959   3 Sheets-Sheet 3

INVENTOR.
Anton F. Erickson
BY
His Attorney 3,027,975
BRAKE GREASE GUARD
Anton F. Erickson, Dayton, Ohio, assignor to General Motors Corporation, Detroit, Mich., a corporation of Delaware
Filed Sept. 9, 1959, Ser. No. 838,943
4 Claims. (Cl. 184—106)

This invention relates to a vehicle drum brake and more particularly to a means for collecting grease and preventing the grease from dripping on the inner periphery of the brake drum.

In the conventional vehicle drum brake the front wheel and brake drum are rotatably mounted on a bearing supported by a spindle. The bearing assembly for mounting of the wheel has a grease seal to prevent grease from leaking from the bearing internally in the brake. In the event of failure of the grease seal, the grease may leak on the inner periphery of the brake drum and cause erratic braking and in some cases locking of the brake shoes with the drum. Accordingly, this invention is intended to prevent the grease which may leak from the front wheel bearing from dripping on the inner periphery of the brake drum. The grease leaking from the wheel bearing is vented to the external side of the backing plate thereby eliminating any danger of erratic braking caused by grease on the brake drum.

It is an object of this invention to provide a grease cup having a resilient flange to form a seal with the backing plate.

It is a further object of this invention to provide a means for collecting excess grease and venting to the outside of the brake any grease which may have leaked from the wheel bearings. The grease vents on the inboard side of the backing plate where it is readily visible to indicate a defective wheel bearing seal.

The objects of this invention are accomplished by means of forming an annular depression on the inboard side of the backing plate. The depression has an axially extending wall for the reception of a grease cup. The grease cup has an axial flange which is expanded radially outwardly against the axial wall in the depression of the backing plate to thereby form a seal. The hub section of the vehicle wheel extends through a central opening in the depression of the backing plate. In this manner any grease leaking from the wheel bearing will drip within the depression in the backing plate. A means for venting is provided on the lower portion of the backing plate or the grease cup to lead the grease externally of the braking structure.

Further objects and advantages of the present invention will be apparent from the following descpription, reference being had to the accompanying drawings wherein preferred embodiments of the present invention are clearly shown.

Figure 1:
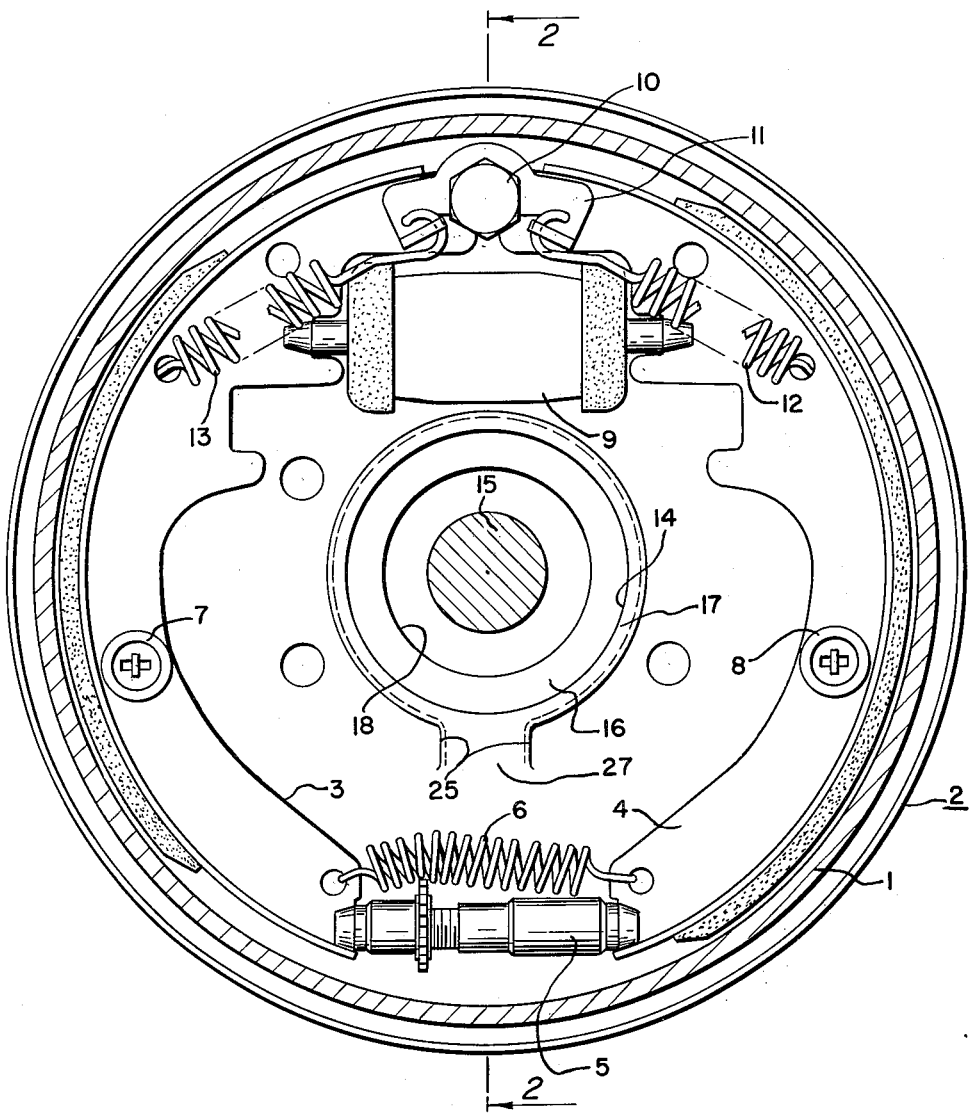
FIGURE 1 is a cross-section view of the brake drum showing the relative position of the various parts within the braking structure.

FIGURE 1 illustrates the relative position of the various parts within the braking structure. The brake drum 1 is rotatably mounted concentric with the backing plate 2. Brake shoes 3 and 4 are mounted for frictionally engaging the inner periphery of the brake drum 1. An adjustable strut is positioned between the ends of the brake shoes 3 and 4. A spring 6 engages a perforation in the ends of the shoes 3 and 4 and maintains a constant contact between the ends of the adjustable strut 5 and the brake shoes 3 and 4. The hold down pin assembly 7 aligns shoe 3 relative to the backing plate. The hold down pin assembly 8 aligns the brake shoe 4 relative to the backing plate. A hydraulic wheel cylinder 9 is positioned between the opposite two adjacent ends of the brake shoes 3 and 4. An anchor pin 10 is placed between the opposite two ends of the brake shoes 3 and 4 and provides an anchor means for the drum brake. The anchor pin supports an anchor plate 11 which provides a means for attaching the retraction springs 12 and 13. The retraction spring 12 retracts the brake shoe 4 and retraction shoe 13 retracts the brake shoe 3.

The backing plate 2 is provided with an annular central opening 14 for reception of the wheel spindle 15. A grease cup 16 is mounted concentrically within an annular depression 17 within the backing plate. The grease cup 16 also has a central opening 18 for the reception of the wheel spindle 15.

Figure 2:
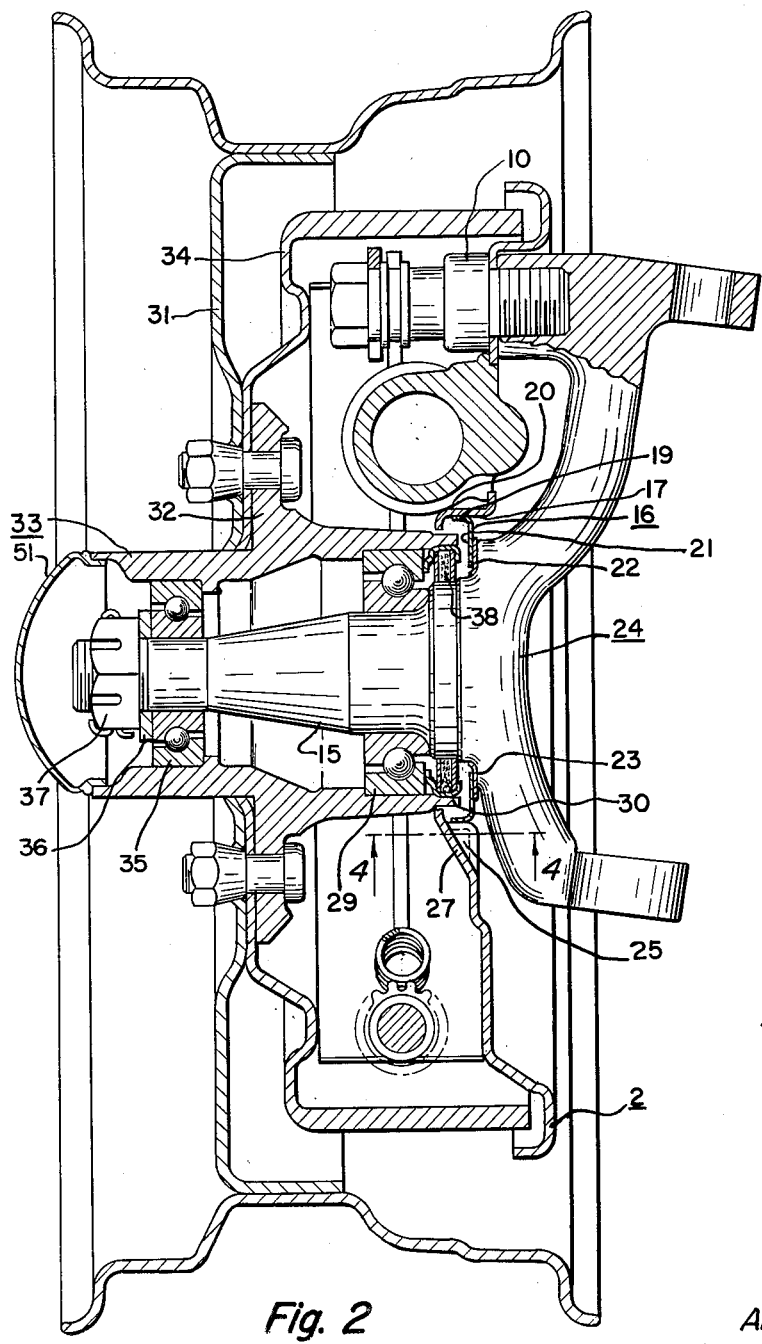
FIGURE 2 is a cross-section view taken on line 2—2 of FIGURE 1 showing the location of the wheel bearing relative to the various parts within the braking structure.
Figure 4:
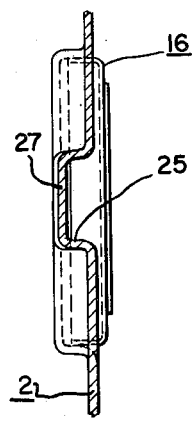
FIGURE 4 is a cross-section view taken on line 4—4 of FIGURE 2.

FIGURE 2 illustrates the grease cup 16 inserted within the annular depression 17 in the backing plate 2. The grease cup has an axially extending flange 19 which expands radially against the axial flange 20 in the annular depression 17. A radial wall 21 of the grease cup 16 seats on an annular seating disk 22. The seating disk 22 bears against a radial flange 23 on the steering knuckle 24.

FIGURE 1 and FIGURE 2 illustrate the version wherein the grease cup 16 does not contain a vent. The venting means is formed in the backing plate by the use of a groove 25 extending downwardly from the annular depression 17 on the backing plate 2. In FIGURE 2 this shows a clearance between the outboard edge of the axially extending flange 19 of the grease cup 16 and the portion of the backing plate 27 forming the groove 25. Any grease leaking from the bearing assembly 29 drips on the inboard edge 30 of the hub 33. The grease drips within the grease cup 16 and flows from the grease cup into the groove 25 along the external side of the backing plate 2.

FIGURE 2 illustrates a wheel 31 bolted to the radial flange 32 on the wheel hub 33. The wheel hub also carries the brake drum 34. The wheel hub is rotatably mounted on the bearing assemblies 29 and 35. The bearing assemblies 35 and 29 are concentrically mounted on the spindle 15. A washer 36 and nut 37 fasten the bearing assemblies and hub section on the spindle 15. A cover 51 is mounted on the outboard end of the hub 33 to enclose the bearing assembly.

The inboard end of the hub is provided with a seal 38 to retain the grease within the bearing assembly. In the event of failure of the seal 38, the grease is not permitted to drip on the inner periphery of the drum 34. The grease will drip in such a manner that the grease is vented through the groove 25 to the outboard side of the backing plate 2.

As the backing plate 2 is assembled on the steering knuckle the annular depression receives the grease cup 16. The inboard side of the radial flange 21 bears against the annular seating disk 22 which in turn engages the radial flange 23 of the steering knuckle 24. This provides a seal against road splash and other impurities for the greater portion of the circumference of the grease cup and a limited drain opening through the groove 25.

A modification of this structure is indicated in FIG-

URE 3. The steering knuckle 24 is provided with a spindle 15 for mounting the bearing assembly 29. The bearing assembly 29 provides a rotatable mounting for the hub 33 of the wheel 31. The backing plate 40 is provided with an annular depression 41 for the reception of a grease cup 42. The grease cup 42 has an axially extending flange 43 resiliently expanding against the axial wall 44 of the annular depression 41. This provides a positive seal about the complete outer periphery of the grease cup 42. Grease is retained within the grease cup 42 until removed manually.

Figure 5:
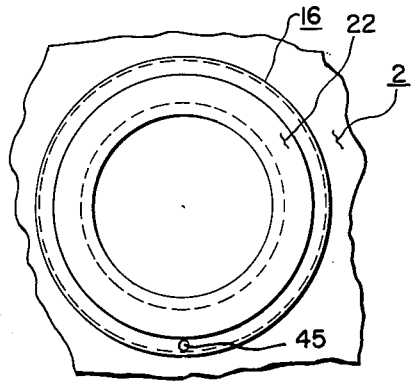
FIGURE 5 is a fragmentary view taken in the direction of arrow 5 shown in FIGURE 6.
Figure 6:
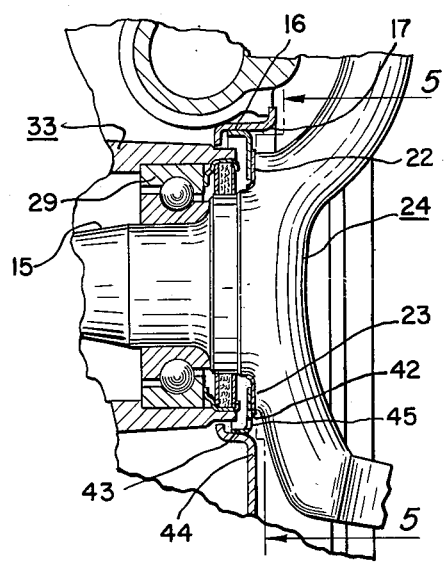
FIGURE 6 is a cross-section view of a modified version wherein the vent is placed within the grease cup.

FIGURE 5 illustrates the vent 45 as shown in FIGURE 6. The braking structure illustrated is for a vehicle drum brake. The annular depression formed within the backing plate 2 forms a seating for the grease cup 16. The grease cup is seated in such a manner that it is not necessary to weld the two elements 16 and 2 together in the assembly. The construction of the grease cup having a slightly oversize radial flange 43 forced into the annular depression 17 provides a positive seal about the inner periphery of the depression 17. The grease cup 16 seats firmly against the annular seating disk 22 which in turn seats on the radial flange 23 of the steering knuckle 24. This provides a positive seal against road splash in the central portion of the backing plate. The only vent in this structure is the vent hole 45 in the lower portion of the grease cup 42. The vent hole 45 is smaller than the groove 25 and thereby cuts down the possibility of entrance of road splash within the braking structure.

Figure 3:
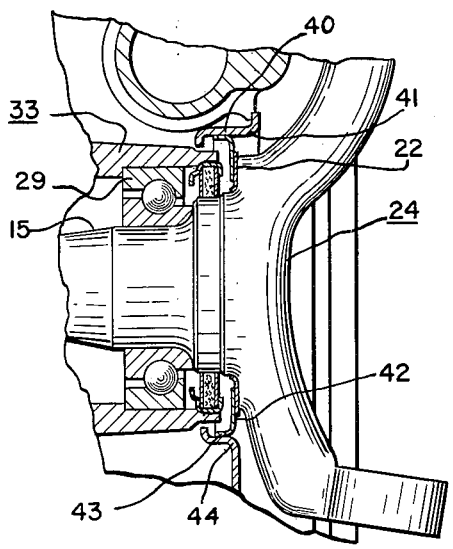
FIGURE 3 is a modified cross-section view where no vent is employed for venting the excess grease from the grease cup.

The modification as illustrated in FIGURES 3 and 5 provides a positive sealing about the total outer periphery of the grease cup 42. The only venting means is the vent hole 45. This vent reduces the possiblility of road splash entering the braking structure and yet retains a means for venting any grease which may leak from the bearing assembly 29.

While the embodiments of the invention as herein disclosed constitute the preferred form, it is to be understood that other forms might be adopted.

What is claimed is as follows:

1. A vehicle wheel and drum brake assembly comprising in combination, a support member having means for supporting a bearing, a bearing mounted on said support member, a vehicle wheel and brake drum rotatably supported on said bearing, grease collecting means including a backing plate mounted on said support member and having a central annular depression, a central opening concentric with said depression in said backing plate receiving the hub portion of said wheel, an annular grease cup having a resilient axially extending flange for radially expanding to form a tight seal between said backing plate and grease cup, means for forming a seal with said grease cup and forming a seal with a radial wall on said support member, an opening formed in the lower portion of said annular grease cup to form a venting means for excess grease from said bearing means to vent the excess grease to the exterior portion of said backing plate.

2. A vehicle wheel and drum brake assembly comprising in combination, a wheel support member, a bearing means mounted on said wheel support member, a vehicle wheel and brake drum rotatably mounted on said bearing means, grease collecting means including a backing plate mounted on said support member, an annular depression formed in the central portion of said backing plate, said annular depression having a radial flange portion extending outboard beyond the inboard edge of the hub section of said wheel, said radial flange on said backing plate thereby preventing excess grease from depositing on the inner periphery of said brake drum, a grease cup having a radial flange and an axial flange, said axial flange on said grease cup having a resilient portion radially expanding against the inner periphery of the depression of the central portion of said backing plate, said radially extending flange on said grease cup bearing resiliently against a disk, said disk bearing against a radial wall on said support member and effecting thereby a positive seal, venting means formed on the lower portion of said drepression and said backing plate providing a means for removal of excess grease to indicate to the operator of the vehicle the presence of a failure of a seal provided on the bearing means for said wheel.

3. A vehicle wheel and drum brake assembly comprising in combination, a wheel support member, a bearing mounted on said wheel support member, a vehicle wheel and brake drum rotatably mounted on said bearing, grease collecting means including a backing plate mounted on said support member, an annular depression formed in the central portion of said backing plate, said annular depression having an axial flange extending outboard beyond inboard edge of the hub section of said wheel, said axial flange of said backing plate formed intergral with a radially inwardly extending flange, a grease cup having a resilient axially extending flange received within the axially extending flange of said backing plate to form a seal within the inner periphery of said annular depression of said backing plate, said grease cup having a radial flange adjoining said axially extending flange abutting a radial wall means of said support member to form a seal thereby providing a grease collecting means for said bearing formed within the depression on said backing plate.

4. A vehicle wheel and drum brake assembly comprising in combination, a wheel support member, a bearing mounted on said wheel support member, a vehicle wheel and brake drum rotatably mounted on said bearing, grease collecting means including a backing plate mounted on said support member, an annular depression formed in the central portion of said backing plate, said annular depression having an axially extending flange adjoining a radially inwardly extending flange at a point extending outboard the inboard edge of the hub section of said wheel, a grease cup having a resilient axial flange received within the axially extending flange of said depression in said backing plate to form a seal, said grease cup having a radially extending flange adjoining said axially extending flange to form a seating portion for said grease cup, an annular disk mounted adjacent said radially extending flange on said grease cup and adjacent a radial wall on said support member to provide a seal between said grease cup and said annular disk and form a grease collecting means within the annular depression of said backing plate, a venting means on the lower portion of said grease cup forming means for removal of excess grease within said grease cup to the external portion of the braking structure.

References Cited in the file of this patent
UNITED STATES PATENTS

| 1,019,755 | Brush | Mar. 12, 1912 |
| 1,417,410 | Ram | May 23, 1922 |
| 1,756,995 | Sanford et al. | May 6, 1930 |
| 1,761,927 | Main | June 3, 1930 |
| 2,646,857 | Thomas | July 28, 1953 |